US009143055B2

United States Patent
Lu

(10) Patent No.: US 9,143,055 B2
(45) Date of Patent: Sep. 22, 2015

(54) CELL INTERFACE

(75) Inventor: Chao-Cheng Lu, Taipei (TW)

(73) Assignee: Chao-Cheng Lu, Taipei (TW)

( * ) Notice: Subject to any disclaimer, the term of this patent is extended or adjusted under 35 U.S.C. 154(b) by 578 days.

(21) Appl. No.: 13/136,351

(22) Filed: Aug. 1, 2011

(65) Prior Publication Data

US 2013/0033311 A1    Feb. 7, 2013

(51) Int. Cl.
*H01M 14/00*    (2006.01)
*H02M 7/5387*    (2007.01)

(52) U.S. Cl.
CPC ................................ *H02M 7/5387* (2013.01)

(58) Field of Classification Search
CPC ........................... H01M 10/425; H02M 7/5397
USPC .............................................. 429/7
See application file for complete search history.

(56) References Cited

U.S. PATENT DOCUMENTS 5,796,238 A * 8/1998 Hiratsuka et al. .......... 320/112
2008/0248335 A1* 10/2008 Kinoshita et al. ............ 429/7

* cited by examiner

*Primary Examiner* — Gary Harris

(57) ABSTRACT

The present invention related to a cell interface. The cell interface includes four diode D1 to D4. A first terminal connected to a voltage terminal of first cell; a second terminal connected to a voltage terminal of second cell; and a third terminal connected to an external voltage terminal of an external electric circuit, another external voltage terminal connected to another voltage terminal of first cell and second cell. The cell interface can prevent from occurring loop current in parallel cell.

3 Claims, 1 Drawing Sheet

CELL INTERFACE

BACKGROUND OF THE INVENTION

1. The Field of the Invention

The present invention relates a cell interface, comprises: anode of the first diode D1 connected together cathode of the third diode D3 form a first terminal, the anode of the fourth diode D4 connected together cathode of the second diode D2 form a second terminal, and the external positive voltage terminal VP connected between cathode of the first diode D1 and anode of the third diode D2, and connected between anode of the third diode D3 and cathode of the fourth diode D4 form a third terminal, the first terminal connected to a positive voltage terminal of first cell E1, the second terminal connected to a positive voltage terminal of second cell E2, the third terminal is external positive voltage terminal VP, can be not occur loop current in cells parallel circuit.

2. Description of Related Art

FIG. 1 shows a schematic diagram of a prior art circuit. The first cell EA and second cell EB uses conventional parallel circuit. Such scheme comes with the following drawbacks:

1. When operation of charge of the first cell E1 and second cell E2, can be occur loop current between the first cell E1 and second cell E2, form a power consumption.
2. When operation of discharge of the first cell E1 and second cell E2, can be occur loop current between the first cell E1 and second cell E2, form a power consumption.
3. When operation of no load of the first cell E1 and second cell E2, can be occur loop current between the first cell E1 and second cell E2, form a power consumption.

SUMMARY OF THE INVENTION

In order to provide cell interface that may in charge or discharge can be not occur loop current in cells parallel circuit, the present invention is proposed the following:

The first object of the invention is to provide four diodes for a cell interface.

The second object of the invention is utilizing forward voltage of the diode to balance cells parallel circuit.

The third object of the invention is use a diode, comprises PN junction diode, or Schottky diode, or Zener diode, or Varactor diode, or Tunnel diode.

The fourth object of the invention is use for secondary cells.

DESCRIPTION OF THE PREFERRED EMBODIMENT

Figure 1:
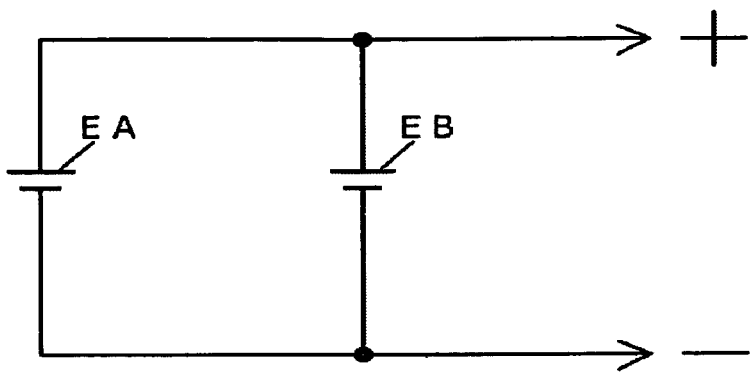
FIG. 1 shows a schematic diagram of a prior art circuit.
Figure 2:
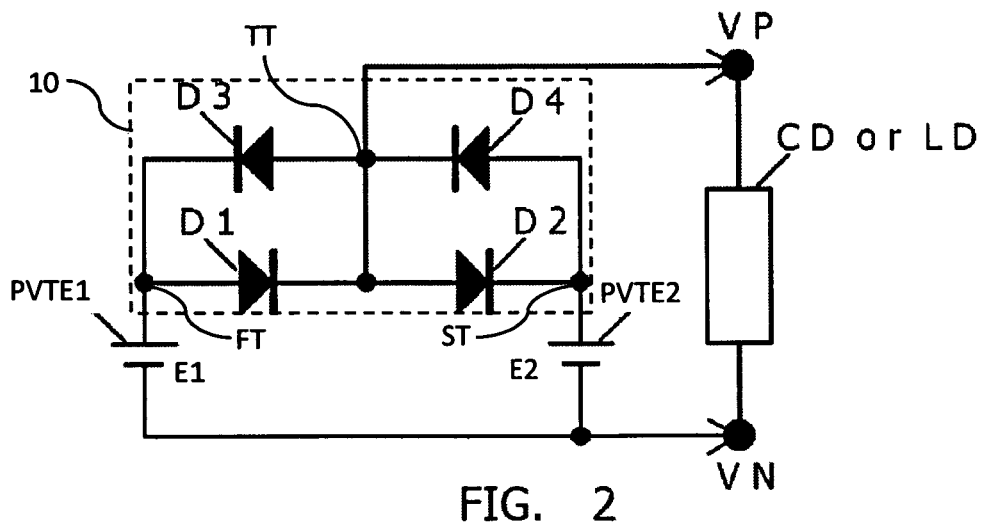
FIG. 2 shows a schematic diagram of a cell interface to a first preferred embodiment of the present invention.

FIG. 2 shows a schematic diagram of a cell interface 10 a first preferred embodiment of the present invention. The cell interface 10 includes four diodes. The diodes are a first diode D1, a second diode D2, a third diode D3, and a fourth diode D4. The first diode D1 has an anode and a cathode, and the third diode D3 has an anode and a cathode. The anode of the first diode D1 is connected to the cathode of the third diode D3, and the cathode of the first diode D1 is connected to the anode of the third diode D3. Wherein the anode of the first diode D1 and the cathode of the third diode D3 defined as a first terminal FT. Moreover, the second diode D2 has an anode and a cathode, and the fourth diode D4 has an anode and a cathode. The anode of the second diode D2 is connected to the anode of the third diode and the cathode of the first diode and the fourth diode, and the anode of the fourth diode is connected to the cathode of the second diode D2. Wherein the anode of the fourth diode D4 and the cathode of the second diode D2 defined as a second terminal ST, and the cathode of the fourth diode D4, the anode of the second diode D2, the anode of the third diode D3, and the cathode of first diode D1 defined as a third terminal TT. In the embodiment, a positive voltage terminal PVTE1 of a first cell E1 can connected to an electrode of a first diode D1 and an electrode of a third diode D3, and a positive voltage terminal PVTE2 of a second cell E2 connected to an electrode of a fourth diode D4 and an electrode of a second diode D2. Wherein the electrode of a first diode D1 can be defined as an anode or a cathode, other diodes D2-D4 are also same definition. In FIG. 2, positive voltage terminal PVTE1 of the first cell E1 connected to an anode of the first diode D1 and a cathode of the third diode D3, positive voltage terminal PVTE2 of the second cell E2 connected to anode of the fourth diode D4 and cathode of the second diode D2; the external positive voltage terminal VP connected between a cathode of the first diode D1 and an anode of the second diode D2, and connected between an anode of the third diode D3 and a cathode of the fourth diode D4 form a third terminal TT of present invention; the anode of the first diode D1 connected together a cathode of the third diode D3 form a first terminal FT of present invention, and the first terminal FT is also connected with the voltage terminal of the first cell; the anode of the fourth diode D4 connected together the cathode of the second diode D2 form a second terminal ST of present invention, and the second terminal ST is also connected with voltage terminal of the seconds cell.

In FIG. 2, the operation theorem of cell charge of present invention, while the positive voltage at external positive voltage terminal VP of charge device CD, the current of positive voltage passes through the third diode D3 and first cell E1, and back to external negative voltage terminal VN, another current of positive voltage passes through the second diode D2 and second cell E2, and back to external negative voltage terminal VN.

In FIG. 2, the operation theorem of cell discharge of present invention, while a load LD connected between external positive voltage terminal VP and external negative voltage terminal VN, the current of first cell E1 passes through the first diode D1, external positive voltage terminal VP, load LD and back to external negative voltage terminal VN, another current of second cell E2 passes through the fourth diode D4, external positive voltage terminal VP, load LD and back to external negative voltage terminal VN.

In FIG. 2, the anode of the first diode D1 connected to positive voltage terminal PVTE1 of first cell E1, cathode of the first diode D1 connected to anode of the second diode D2, cathode of second diode D2 connected to positive voltage terminal PVTE2 of second cell E2, utilizing forward voltage of first diode D1 and second diode D2, can be not occur loop current between the first cell E1 and the second cell E2 parallel circuit. In operation theorem: when the voltage of first cell E1 under second cell E2 or the voltage of first cell E1 over second cell E2; can be occur loop current between the first cell E1 and the second cell E2 parallel circuit, if the voltage of first cell E1 over second cell E2 is 1.4 volt, utilizing 0.7 volt forward voltage of first diode D1 and 0.7 volt forward voltage of second diode D2 is 1.4 volt to balance the voltage of first cell E1 over second cell E2, can be not occur loop current between the first cell E1 and the second cell E2 parallel circuit; when the voltage of first cell E1 under second cell E2 or the voltage of first cell E1 over second cell E2, can be occur loop current between the first cell E1 and the second cell E2 parallel circuit, if the voltage of second cell E2 over first cell E1 is 1.4 volt, utilizing 0.7 volt forward voltage of fourth diode D4 and 0.7 volt forward voltage of third diode D3 is 1.4 volt to balance the voltage of second cell E2 over first cell E1, can be not occur loop current between the second cell E2 and the first cell E1 parallel circuit; when the voltage of second cell E2 over first cell E1 more 1.4 volt, least one of the third diode D3 or least one of the fourth diode D4 to balance the voltage of second cell E2; when the voltage of first cell E1 over second cell E2 more 1.4 volt, least one of the first diode D1 or least one of the second diode D2 to balance the voltage of first cell E1; when the voltage of first cell E1 over second cell E2 less than 1.4 volt, the first diode D1 or the second diode D2 may be use schottky diode to balance the voltage of first cell E1; when the voltage of second cell E2 over first cell E1 less than 1.4 volt, the third diode D3 or the fourth diode D4 may be use schottky diode to balance the voltage of second cell E2; the third terminal TT of present invention, can be connected to external electric circuit such as sense voltage input of voltage protection IC, and other protection circuit.

Figure 3:
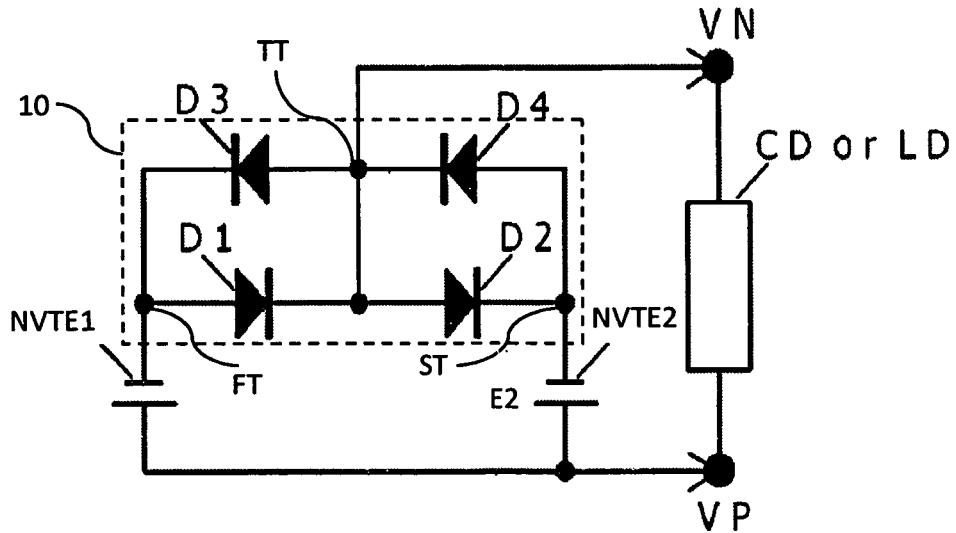
FIG. 3 shows a schematic diagram of a cell interface to a second preferred embodiment of the present invention.

FIG. 3 shows a schematic diagram of a cell interface 10 to a second preferred embodiment of the present invention. In FIG. 3, the negative voltage terminal NVTE1 of the first cell E1 connected to an anode of a first diode D1 and a cathode of a third diode D3, negative voltage terminal NVTE2 of the second cell E2 connected to an anode of a fourth diode D4 and a cathode of a second diode D2; the external negative voltage terminal VN connected between a cathode of the first diode D1 and an anode of the second diode D2, and connected between an anode of the third diode D3 and a cathode of the fourth diode D4 form a third terminal TT of present invention; the anode of the first diode D1 connected together the cathode of the third diode D3 form a first terminal FT of present invention, and a first terminal FT is also connected with the voltage terminal of the first cell; the anode of the fourth diode D4 connected together cathode of the second diode D2 form a second terminal ST of present invention.

In FIG. 3, the operation theorem of cell charge of present invention, while the positive voltage at external positive voltage terminal VP of charge device CD, the current of positive voltage passes through the first cell E1 and first diode D1, and back to external negative voltage terminal VN, another current of positive voltage passes through the second cell E2 and fourth diode D4, and back to external negative voltage terminal VN.

In FIG. 3, the operation theorem of cell discharge of present invention, while a load LD connected between external positive voltage terminal VP and external negative voltage terminal VN, the current of first cell E1 passes through external positive voltage terminal VP, load LD, external negative voltage terminal VN, third diode D3 and back to the first cell E1, another current of second cell E2 passes through external positive voltage terminal VP, load LD, external negative voltage terminal VN and the second diode D2, and back to the second cell E2.

In FIG. 3, the anode of the first diode D1 connected to negative voltage terminal NVTE1 of first cell E1, cathode of the first diode D1 connected to anode of the second diode D2, cathode of second diode D2 connected to negative voltage terminal NVTE2 of second cell E2, utilizing forward voltage of first diode D1 and second diode D2, can be not occur loop current between the first cell E1 and the second cell E2 parallel circuit. In operation theorem: when the voltage of first cell E1 under second cell E2 or the voltage of first cell E1 over second cell E2, can be occur loop current between the first cell E1 and the second cell E2 parallel circuit, if the voltage of second cell E2 over first cell E1 is 1.4 volt, utilizing 0.7 volt forward voltage of first diode D1 and 0.7 volt forward voltage of second diode D2 is 1.4 volt to balance the voltage of second cell E2 over first cell E1, can be not occur loop current between the first cell E1 and the second cell E2 parallel circuit; when the voltage of second cell E2 under first cell E1 or the voltage of second cell E2 over first cell E1, can be occur loop current between the second cell E2 and the first cell E1 parallel circuit, if the voltage of first cell E1 over second cell E2 is 1.4 volt, utilizing 0.7 volt forward voltage of fourth diode D4 and 0.7 volt forward voltage of third diode D3 is 1.4 volt to balance the voltage of first cell E1 over second cell E2, can be not occur loop current between the first cell E1 and the second cell E2 parallel circuit; when the voltage of first cell E1 over second cell E2 more 1.4 volt, least one of the third diode D3 or least one of the fourth diode D4 to balance the voltage of first cell E1; when the voltage of second cell E2 over first cell E1 more 1.4 volt, least one of the first diode D1 or least one of the second diode D2 to balance the voltage of second cell E2; when the voltage of second cell E2 over first cell E1 less than 1.4 volt, the first diode D1 or the second diode D2 may be use schottky diode to balance the voltage of second cell E2; when the voltage of first cell E1 over second cell E2 less than 1.4 volt, the third diode D3 or the fourth diode D4 may be use schottky diode to balance the voltage of first cell E1; the third terminal TT of present invention, can be connected to, external electric circuit such as sense voltage input of voltage protection IC, and other protection circuit.

What is claimed is:

1. A cell interface, is connected with a first cell and a second cell wherein the first cell and the second cell have a positive voltage terminal and a negative voltage terminal respectively, the cell interface circuit comprising:

a first diode and a third diode, the first diode having an anode and a cathode, the third diode having an anode and a cathode, the anode of the first diode connected to the cathode of the third diode, and the cathode of the first diode connected to the anode of the third diode, wherein the anode of the first diode and the cathode of the third diode defined as a first terminal;

a second diode and a four diode, the second diode having an anode and a cathode, the fourth diode having an anode and a cathode, the anode of the second diode connected to the anode of the third diode and the cathode of the first diode and the fourth diode, and the anode of the fourth diode connected to the cathode of the second diode, wherein the anode of the fourth diode and the cathode of the second diode defined as a second terminal, and the cathode of the fourth diode, the anode of the second diode, the anode of the third diode, and the cathode of first diode defined as a third terminal;

wherein the first terminal connected to the positive voltage terminal of the first cell, and the second terminal also connected to the positive voltage terminal of the second cell, or the first terminal connected to the negative voltage terminal of the first cell, and the second terminal also connected to the negative voltage terminal of the second cell.

2. A cell interface as claimed in claim 1, characterized in that the third terminal connected to an external voltage terminal of a charge device or a load.

3. A cell interface as claimed in claim 2, characterized in that the charge device or the load is a sense voltage input of voltage protection IC.

\* \* \* \* \*